US007228495B2

(12) United States Patent
Adapathya et al.

(10) Patent No.: US 7,228,495 B2
(45) Date of Patent: Jun. 5, 2007

(54) METHOD AND SYSTEM FOR PROVIDING AN INDEX TO LINKED SITES ON A WEB PAGE FOR INDIVIDUALS WITH VISUAL DISABILITIES

(75) Inventors: Ravi Shankarnarayan Adapathya, Durham, NC (US); David Frederick Champion, Durham, NC (US); Alan Joseph Happ, Raleigh, NC (US); Brad Michael Lawrence, Durham, NC (US); Kevin Laverne Schultz, Raleigh, NC (US)

(73) Assignee: International Business Machines Corporation, Armonk, NY (US)

( * ) Notice: Subject to any disclaimer, the term of this patent is extended or adjusted under 35 U.S.C. 154(b) by 1245 days.

(21) Appl. No.: 09/794,742

(22) Filed: Feb. 27, 2001

(65) Prior Publication Data

US 2002/0120645 A1 Aug. 29, 2002

(51) Int. Cl.
G06F 15/00 (2006.01)
G06F 17/00 (2006.01)
(52) U.S. Cl. .................... 715/513; 715/501.1
(58) Field of Classification Search ............ 715/501.1, 715/513; 379/88.17, 88.13; 704/270, 270.1, 704/260, 275; 707/10; 345/839, 418; 434/113
See application file for complete search history.

(56) References Cited

U.S. PATENT DOCUMENTS

| | | | | |
|---|---|---|---|---|
| 4,836,784 A | 6/1989 | Joachim | ................ | 434/113 |
| 5,233,333 A | 8/1993 | Borsuk | ................ | 340/731 |
| 5,475,399 A | 12/1995 | Borsuk | ................ | 345/130 |
| 5,721,851 A * | 2/1998 | Cline et al. | ................ | 345/839 |
| 5,724,595 A * | 3/1998 | Gentner | ................ | 715/501.1 |
| 5,778,372 A * | 7/1998 | Cordell et al. | ................ | 707/100 |
| 5,799,063 A | 8/1998 | Krane | ................ | 379/67 |
| 5,899,975 A | 5/1999 | Nielsen | ................ | 704/260 |
| 5,915,001 A | 6/1999 | Uppaluru | ................ | 379/88.22 |
| 5,935,210 A * | 8/1999 | Stark | ................ | 709/224 |
| 5,953,392 A | 9/1999 | Rhie et al. | ................ | 379/88.13 |
| 5,983,184 A | 11/1999 | Noguchi | ................ | 704/270 |
| 5,991,781 A * | 11/1999 | Nielsen | ................ | 715/513 |
| 6,075,537 A | 6/2000 | Adapathya et al. | ................ | 345/357 |
| 6,085,161 A * | 7/2000 | MacKenty et al. | ................ | 704/270 |

(Continued)

FOREIGN PATENT DOCUMENTS

EP 0889 627 A2 1/1999

(Continued)

OTHER PUBLICATIONS

Callihan, Steve, Learn HTML in a Weekend, 3rd Edition, Prima Publishing, Roseville, CA, © 2000, pp. 276, 291-292 and 299-301.*

*Primary Examiner*—Shahid Alam
*Assistant Examiner*—Robert Stevens
(74) *Attorney, Agent, or Firm*—Sawyer Law Group LLP

(57) ABSTRACT

A system and method in accordance with the present invention allows blind and visually impaired users to quickly identify links to relevant material when "viewing" web pages that consist primarily of either plain text or images. By generating an aural or visual index to the links on the page being "viewed", blind and visually impaired users can quickly jump to interesting sites that are linked from the current page without having to wait for the entire page to be voiced by a screen reader application.

31 Claims, 18 Drawing Sheets

U.S. PATENT DOCUMENTS

| | | | |
|---|---|---|---|
| 6,088,731 A | 7/2000 | Kiraly et al. | 709/229 |
| 6,101,472 A | 8/2000 | Giangarra et al. | 704/275 |
| 6,101,473 A | 8/2000 | Scott et al. | 704/275 |
| 6,256,631 B1 * | 7/2001 | Malcolm | 707/10 |
| 6,275,829 B1 * | 8/2001 | Angiulo et al. | 707/104.1 |
| 6,282,512 B1 * | 8/2001 | Hemphill | 704/270.1 |
| 6,314,451 B1 * | 11/2001 | Landsman et al. | 709/203 |
| 6,344,851 B1 * | 2/2002 | Roberts et al. | 345/418 |
| 6,349,132 B1 * | 2/2002 | Wesemann et al. | 379/88.17 |
| 6,377,928 B1 * | 4/2002 | Saxena et al. | 704/275 |
| 6,381,637 B1 * | 4/2002 | Kamada | 709/218 |
| 6,563,913 B1 * | 5/2003 | Kaghazian | 379/93.24 |
| 6,670,968 B1 * | 12/2003 | Schilit et al. | 715/760 |
| 6,685,475 B1 * | 2/2004 | Maruyama et al. | 434/118 |
| 6,732,078 B1 * | 5/2004 | Luomi et al. | 704/270.1 |
| 6,769,019 B2 * | 7/2004 | Ferguson | 709/219 |

FOREIGN PATENT DOCUMENTS

| | | |
|---|---|---|
| EP | 889 627 A2 | 1/1999 |
| WO | WO99 48088 A | 9/1999 |
| WO | WO 99 48088 A | 9/1999 |

* cited by examiner

```
<HTML>
<!-- Lotus-Domino (Release 4.6.3b (Intl) - 26 February 1999 on Windows NT/Intel) -->
<HEAD>
<BODY BGCOLOR=FFFFFF><META NAME="OWNER" CONTENT="Leon Wasson,
LSW@US.IBM.COM"><META NAME="ABSTRACT" CONTENT="Going Global
Homepage."><META NAME="KEYWORDS" CONTENT="Going Global Homepage Culture
Busines Travel"><SCRIPT Language="JavaScript"><!--
if(top.frames.length >1) {top.location
="/Global/Global.nsf/AllDocs/Homepage?OpenDocument&Style=Frames&Area=World";}
// --></SCRIPT><TITLE>IBM Going Global Homepage</TITLE></HEAD>
<BODY TEXT="000000" BGCOLOR="ffffff">
<TABLE WIDTH=600 BORDER=0 CELLPADDING=0 CELLSPACING=0
BGCOLOR="#FFCF9F"><TR ALIGN=LEFT><TD>

<TABLE BORDER=0 CELLSPACING=0>
<TR VALIGN=top><TD WIDTH="594" COLSPAN=2>
<P><TABLE WIDTH=600 BORDER=0 CELLPADDING=0 CELLSPACING=0
```

Figure 5A

VALIGN=BOTTOM><TR><TD VALIGN=BOTTOM ALIGN=LEFT><A
HREF="http://w3.hraccess.ibm.com/" TARGET="_top"><IMG
SRC="/Global/GGArt.nsf/Links/top1p1/$FILE/top1p1.gif" WIDTH=600 HEIGHT=50
ALT="IBM HR" BORDER=0 VALIGN=BOTTOM ALIGN=LEFT VSPACE=0
HSPACE=0></A></TD></TR></TABLE></TD></TR>

<TR VALIGN=top><TD WIDTH="216"><IMG HEIGHT=358 WIDTH=218
SRC="/Global/GGArt.nsf/Links/banner/$FILE/banner.GIF"BORDER=0 ALT="Side Navigation
Banner" USEMAP="#map1" > <MAP NAME="map1"><AREA SHAPE="rect" ALT="What's
Culture?"
COORDS="78,22,200,49"HREF="/Global/Global.nsf/AllDocs/InitialFrameset?OpenDocu
ment&Style=Frames&Bottom=/Global/Global.nsf/AllDocs/WhatIsCulture?OpenDocume
nt&Style=Frames&Content=WhatsCulture"><AREA SHAPE="rect" ALT="Rip & Read"
COORDS="78,58,200,86"HREF="/Global/Global.nsf/AllDocs/InitialFrameset?OpenDocu
ment&Style=Frames&Bottom=/Global/Rip&Read.nsf/Rip&Read?OpenForm&Style=Fra
mes"><AREA SHAPE="rect" ALT="IBMers Say..."
COORDS="78,96,200,125"HREF="/Global/Global.nsf/AllDocs/InitialFrameset?OpenDoc
ument&Style=Frames&Bottom=/Global/Discuss.nsf/By+Category?OpenView&Style=Fr
ames"><AREA SHAPE="rect" ALT="Related Links"
COORDS="78,136,200,165"HREF="/Global/Global.nsf/AllDocs/InitialFrameset?OpenDo
cument&Style=Frames&Bottom=/Global/Global.nsf/AllDocs/RelatedLinks?OpenDocum
ent&Style=Frames"><AREA SH
APE="rect" ALT="Feedback"
COORDS="78,174,200,203"HREF="/Global/Global.nsf/AllDocs/InitialFrameset?OpenDo
cument&Style=Frames&Bottom=/Global/Feedback.nsf/Feedback?OpenForm&Style=Fr
ames"><AREA SHAPE="rect" ALT="About This Site" COORDS="78, 212,
200,238"HREF="/Global/Global.nsf/AllDocs/InitialFrameset?OpenDocument&Style=Fra
mes&Bottom=/Global/Global.nsf/AllDocs/AboutThisSite?OpenDocument&Style=Frame
s"></MAP></TD><TD WIDTH="378"><IMG
SRC="/Global/GGArt.nsf/Links/textagif/$FILE/textagif.gif" BORDER=0 WIDTH=346
ALT="Going Global means working together with people with different culture-based
expectations"><BR>
<TABLE WIDTH=275 BORDER=0 CELLPADDING=0 CELLSPACING=0><TR
ALIGN=LEFT><TD ALIGN=LEFT VALIGN=MIDDLE><B>Click Go to Choose a
Country</B></TD><TD ALIGN=RIGHT VALIGN=MIDDLE><A
HREF="/Global/Global.nsf/AllDocs/InitialFrameset?OpenDocument&Style=Frames&Bottom=/
Global/Global.nsf/AllDocs/CountryTable?OpenDocument&Style=Frames"><IMG WIDTH=50
HEIGHT=25 SRC="/Global/GGArt.nsf/Links/Go/$FILE/Go.GIF" BORDER=0
ALT="Go!"></A></TD></TABLE><BR>
<B>Or Click the Map:</B><BR>

<MAP NAME="1da.map">
<AREA SHAPE=rect COORDS="249,35,359,173"
HREF="/Global/Global.nsf/AllDocs/Homepage?OpenDocument&Style=Frames&Area=AP">
<AREA SHAPE=rect COORDS="135,0,249,173"
HREF="/Global/Global.nsf/AllDocs/Homepage?OpenDocument&Style=Frames&Area=EMEA
">

Figure 5B

```
<AREA SHAPE=rect COORDS="250,1,359,34"
HREF="/Global/Global.nsf/AllDocs/Homepage?OpenDocument&Style=Frames&Area=EMEA
">
<AREA SHAPE=rect COORDS="0,0,134,74"
HREF="/Global/Global.nsf/AllDocs/Homepage?OpenDocument&Style=Frames&Area=NA">
<AREA SHAPE=rect COORDS="1,74,136,172"
HREF="/Global/Global.nsf/AllDocs/Homepage?OpenDocument&Style=Frames&Area=LA"></
MAP>
<A
HREF="/Global/Global.nsf/ebdce8a4e605f8da852564e500533eb8?OpenNavigator"><IMG
SRC="/Global/Global.nsf/ebdce8a4e605f8da852564e500533eb8/$ViewMapLayout/0.61c?Op
enElement&FieldElemFormat=gif" WIDTH=360 HEIGHT=173 USEMAP="#1da.map"
BORDER=0 ISMAP></A><BR>
<A
HREF="/Global/Global.nsf/AllDocs/InitialFrameset?OpenDocument&Style=Frames&Bottom=/
Global/Scenario.nsf/All/WebDisplayWide?OpenDocument&Style=Simple&Country=India&Styl
e=Frames"><IMG SRC="/Global/GGArt.nsf/Links/indiaswipe/$FILE/indiaswipe.gif"
WIDTH=360 HEIGHT=70 BORDER=0 ALT="In this country, a direct "no" to an invitation
(even if you have no plans to attend) could offend your host.
Why? Click Here."></A></TD></TR>

<TR VALIGN=top><TD WIDTH="594" COLSPAN=2><TABLE WIDTH=600 HEIGHT=19
BORDER=0 CELLPADDING=0 CELLSPACING=0 VALIGN=BOTTOM><TR
HEIGHT=19><TD VALIGN=BOTTOM ALIGN=LEFT><A HREF="http://w3.ibm.com"
TARGET="_top"><IMG SRC="/Global/GGArt.nsf/Links/ibmnavp1/$FILE/ibmnavp1.gif"
WIDTH=120 HEIGHT=19 ALT="w3.ibm.com" BORDER=0 VALIGN=BOTTOM ALIGN=LEFT
VSPACE=0 HSPACE=0></A><A HREF="http://w3.ibm.com/ibm" TARGET="_top"><IMG
SRC="/Global/GGArt.nsf/Links/ibmnavp2/$FILE/ibmnavp2.gif" WIDTH=102 HEIGHT=19
ALT="About IBM" BORDER=0 VALIGN=BOTTOM ALIGN=LEFT VSPACE=0
HSPACE=0></A><A HREF="http://w3.ibm.com/search" TARGET="_top"><IMG
SRC="/Global/GGArt.nsf/Links/ibmnavp3/$FILE/ibmnavp3.gif" WIDTH=75 HEIGHT=19
ALT="Search" BORDER=0 VALIGN=BOTTOM ALIGN=LEFT VSPACE=0
HSPACE=0></A><A HREF="http://w3.ibm.com/help" TARGET="_top"><IMG
SRC="/Global/GGArt.nsf/Links/ibmnavp4/$FILE/ibmnavp4.gif" WIDTH=79 HEIGHT=19
ALT="Help" BORDER=0 VALIGN=BOTTOM ALIGN=LEFT VSPACE=0 HSPACE=0></A><A
HREF="/Global/Global.nsf/AllDocs/InitialFrameset?OpenDocument&
Style=Frames&Bottom=/Global/Feedback.nsf/Feedback?OpenForm&Style=Frames"
TARGET="Bottom"><IMG SRC="/Global/GGArt.nsf/Links/ibmnavp5/$FILE/ibmnavp5.gif"
WIDTH=94 HEIGHT=19 ALT="Feedback" BORDER=0 VALIGN=BOTTOM ALIGN=LEFT
VSPACE=0 HSPACE=0></A><A HREF="http://www.ibm.com" TARGET="_top"><IMG
SRC="/Global/GGArt.nsf/Links/ibmnavp6/$FILE/ibmnavp6.gif" WIDTH=130 HEIGHT=19
ALT="www.ibm.com" BORDER=0 VALIGN=BOTTOM ALIGN=LEFT VSPACE=0
HSPACE=0></A></TD></TR></TABLE></TD></TR>
</TABLE>
</TD></TR></TABLE>
<BR>
<FONT SIZE=2>Most recent country:  <A
HREF="/Global/Global.nsf/AllDocs/InitialFrameset?OpenDocument&Style=Frames&Bottom=/
Global/Global.nsf/AllDocs/KBSHFrameset?OpenDocument&Style=Frames&Country=Denmar
k&Content=CulturalOverview">Denmark</A>, last updated on 11/23</FONT></BODY>
</HTML>
```

Figure 5C

1. IBM Human Resources Home Page

2. What's Culture

3. Rip and Read

4. IBMers Say

5. Related Links

6. Feedback

7. About this site

Fig. 7

Note for Item 1 in above list: This is the <TITLE> value captured from the linked target page since there is no corresponding ALT text or plain-English descriptor text for this link in the original HTML code.

Note for Item 2 in above list: This is taken as is from the ALT attribute in the original HTML code.

```html
<HTML>
<!-- Lotus-Domino (Release 4.6.3b (Intl) - 26 February 1999 on Windows NT/Intel) -->
<HEAD>
<META NAME="OWNER" CONTENT="Leon Wasson, LSW@US.IBM.COM"><META
NAME="ABSTRACT" CONTENT="Going Global IBMers Say... page."><META
NAME="KEYWORDS" CONTENT="IBMers Say discussion experts Going Global Culture
Business"><BODY BGCOLOR="#FFFFFF"><TITLE>Related Links</TITLE></HEAD>
<BODY TEXT="000000" BGCOLOR="ffffff">

<P>
<TABLE WIDTH="100%" BORDER=0 CELLSPACING=0>
<TR VALIGN=top><TD WIDTH="100%" BGCOLOR="f1f1b4"><B><FONT SIZE=4
COLOR="800000">IBM Internal Links</FONT></B></TD></TR>

<TR></TR>

<TR VALIGN=top><TD WIDTH="100%"><A HREF="http://w3chq.disbursements.ibm.com/"
TARGET=_top"><B><U><FONT COLOR="0000ff">IBM Travel Policy
News/Services</FONT></U></B></A><BR>
Check out this site for details on IBM's travel policy.  Topics include:
<UL><UL><LI>reimbursement<LI>travel policy changes<LI>links to information on
international assignments (US perspective)<LI>other IBM travel specific
links</UL></UL></TD></TR>

<TR VALIGN=top><TD WIDTH="100%"><B>IBM QTravel Database </B><BR>
This notes database is for employee use before making arrangements for foreign travel. It
has information about prohibitions and travel restrictions as well as names of people to
contact to get approval for travel to restricted areas. Essential information about safety,
security, passports and health issues in particular countries is also included. (The database
is located at:  D02DB001 q_dir\travel.nsf) </TD></TR>

<TR VALIGN=top><TD WIDTH="100%"><A
HREF="http://w3.ibm.com/resources/travelweather.html#forecasts"
TARGET="_top"><B><U><FONT COLOR="0000ff">Travel and
Weather</FONT></U></B></A><BR>
A listing of global travel and weather sites inside and  outside of the IBM firewall. It includes
some of sites listed below as well as others. An excellent first stop after you get your update
on the overall cultural 'climate' for the country to which you are traveling and working. For a
language lesson, try the coolest link of all.  </TD></TR>

<TR VALIGN=top><TD WIDTH="100%"><A HREF="http://w3.dial.ibm.com/ibminternal"
TARGET="_top"> <B><U><FONT COLOR="0000ff">International Dial
Access</FONT></U></B></A><BR>
This site provides IBM travelers with information to update their TCP/IP Dial software with dial
access numbers available in many countries only to employees. The numbers are not on the
standard dialer phone lists and can be added only through this site.  Also includes tips for
business travelers.  The URL for this sites is printed on most international travel itineraries
from IBM-approved travel agencies.</TD></TR>

<TR VALIGN=top><TD WIDTH="100%"><A HREF="http://www.europe.ibm.com/euro"
   TARGET=_top"><B><U><FONT COLOR="0000ff">EuroWeb</FONT></U></B></A><BR>
An IBM site that concentrates solely on the Euro and the challenges it presents as companies
prepare for the introduction of a single currency throughout Europe. The site describes IBM's
own preparations for dealing with monetary conversion in Europe. </TD></TR>
```

<TR VALIGN=top><TD WIDTH="100%" BGCOLOR="f1f1b4"><B><FONT SIZE=4
COLOR="800000">External Links </FONT></B></TD></TR>

<TR></TR>

<TR VALIGN=top><TD WIDTH="100%"><B><FONT SIZE=4>Of General Interest
</FONT></B></TD></TR>

<TR></TR>

<TR VALIGN=top><TD WIDTH="100%"><A HREF="http://www.wtgonline.com"
TARGET="_top"><B><U><FONT COLOR="0000ff">World Travel
Guide</FONT></U></B></A><U><FONT COLOR="0000ff"> </FONT></U>A comprehensive
and objective guide to the travelers' world designed to answer all the questions you will ever
need to ask with speed, confidence and authority. Every country in the world is presented in a
detailed and highly structured format for ease of use.  You'll find an overview of the country,
its geography and population, and link to related sites. After getting the basics, you can
plunge into the finer points of the country's weather, social conventions, night life, tipping
practices, and sports offerings.  It is the Internet's version of the best selling World Travel
Guide, long recognized by travel professionals worldwide as the ultimate destination
guide.</TD></TR>

<TR VALIGN=top><TD WIDTH="100%"><A
HREF="http://www.relojournal.com/world.htm#top" TARGET="_top"><B><U><FONT
COLOR="0000ff">Around the World with ReloJournal</FONT></U></B></A><BR>
Links to various travel guides and other useful information organized by country</TD></TR>

<TR VALIGN=top><TD WIDTH="100%"><A HREF="http://www.safewithin.com/travelsafe"
TARGET="_top"><B><U><FONT COLOR="0000ff">Travel
Safety</FONT></U></B></A><BR>
Safe travel involves more than knowing the proper evacuation procedures when you're
staying in a hotel. Little things like making copies of all your important documents (passports,
tickets, medical prescriptions) can help you avoid mishaps when you're on the road.  The site
offers pages on international and domestic travel, child travel, senior travel, women's travel,
accommodations, transportation, and travel safety resources.</TD></TR>
        <TR VALIGN=top><TD WIDTH="100%"><A HREF="http://www.ibm.com/Global/"
            TARGET="_top"><B><U><FONT COLOR="0000ff">IBM
                    PlanetWide</FONT></U></B></A><BR>
A list of IBM Internet sites around the world. Nearly all sites are rendered in the native
language of the country, and many offer translated versions of their content. For example, the
IBM no Brasil site is translated into Spanish today and will be available in English
"soon". This list offers an easy and convenient way to browse information about
IBM operations in countries around the globe.</TD></TR>

<TR VALIGN=top><TD WIDTH="100%"><A HREF="http://www.msimobility.com/fun.htm"
TARGET="_top"><B><U><FONT COLOR="0000ff">Mobility Services
International</FONT></U></B></A><BR>
For the lighter side of cultural differences, check out this frequently updated site. Examples
are "True Expat Adventures" where you can learn about the practical side of
expatriate life from someone who has been there, and "30 Americanisms Foreigners
May Not Understand." There are also links to other international resources and
publications. </TD></TR>
```

<TR VALIGN=top><TD WIDTH="100%"><B><FONT SIZE=4>From the U.S. Government
</FONT></B></TD></TR>

<TR></TR>

<TR VALIGN=top><TD WIDTH="100%"><A HREF="http://www.census.gov/"
TARGET="_top"><B><U><FONT COLOR="0000ff">United States Census
Bureau</FONT></U></B></A><FONT COLOR="0000ff"> </FONT>The U.S. Census Bureau
page provides access to social, demographic and economic information, with a view to trends
shaping U.S. culture. It also provides global population and demographic
information.</TD></TR>

<TR VALIGN=top><TD WIDTH="100%"><A HREF="http://www.ita.doc.gov/"
TARGET="_top"><B><U><FONT COLOR="0000ff">U.S. Department of Commerce -
International Trade Administration</FONT></U></B></A><FONT COLOR="0000ff">
</FONT>This site is dedicated to helping U.S. business compete in the global marketplace
with current information about trade status and opportunities for commerce around the globe.
</TD></TR>

<TR VALIGN=top><TD WIDTH="100%"><A
HREF="http://travel.state.gov/travel_warnings.html" TARGET="_top"><B><U><FONT
COLOR="0000ff">U.S. State Department Travel Advisories</FONT></U></B></A><FONT
COLOR="0000ff"> </FONT>The U.S. Department of State Bureau of Consular Affairs is now
on-line and makes available a variety of helpful information for travelers including the official
U.S. State Department Travel Warnings and Consular Information Sheets. </TD></TR>

<TR VALIGN=top><TD WIDTH="100%"><A HREF="http://www.customs.ustreas.gov"
TARGET="_top"><B><U><FONT COLOR="0000ff">U.S Customs
Service</FONT></U></B></A><FONT COLOR="0000ff"> </FONT>On its Traveler
Information page, this Web site provides all the facts you need to know to enter the U.S. with
minimal hassle. (Rule#1: never take your prescription medication out of its original
container.)</TD></TR>

<TR VALIGN=top><TD WIDTH="100%"><A
HREF="http://www.odci.gov/cia/publications/pubs.html" TARGET="_top"><B><U><FONT
COLOR="0000ff">C.I.A. Publications and Handbook</FONT></U></B></A> This site has
links to a number of interesting and useful sites for the business traveler, albeit from the
perspective of the Central Intelligence Agency, the U.S. 'spy' agency. Of particular note is
The World Factbook with government, population, and economic information.</TD></TR>

<TR VALIGN=top><TD WIDTH="100%"><B><FONT SIZE=4> </FONT></B></TD></TR>

<TR VALIGN=top><TD WIDTH="100%"><B><FONT SIZE=4>Information by Country
</FONT></B></TD></TR>

<TR></TR>

<TR VALIGN=top><TD WIDTH="100%"><A HREF="http://www.iasb.org/cwl/"
TARGET="_top"><B><U><FONT COLOR="0000ff">Current World
Leaders</FONT></U></B></A><FONT COLOR="0000ff"> </FONT>This site offers a current
listing of world leaders as a fee-based service. It's very useful as an initial entry into
countries around the globe. </TD></TR>
```

Figure 9C

```
<TR VALIGN=top><TD WIDTH="100%"><A HREF="http://www.embassy.org/"
TARGET="_top"><B><U><FONT COLOR="0000ff">The Electronic
Embassy</FONT></U></B></A><FONT COLOR="0000ff"> </FONT><BR>
Here you'll find links and information on all of the Foreign Embassies of Washington, D.C.
The site has an excellent set of recommended readings in its virtual library that includes
writings on "Negotiating Across Cultures" and Information Technologies and
International Relations. </TD></TR>

<TR VALIGN=top><TD WIDTH="100%"><A HREF="http://www.getcustoms.com/"
TARGET="_top"><B><U><FONT COLOR="0000ff">Getting Through
Customs</FONT></U></B></A><FONT COLOR="0000ff"> </FONT><BR>
This site provides a database of global business practices, cognitive styles, cultural
overviews, medical & political information, contacts, religious & societal influences
on business protocol, Cultural I.Q. Quizzes, and more for international travelers. Information
on selected countries around the globe. <BR>
<BR>
<A HREF="http://wtscpok.itso.ibm.com/" TARGET="_top"><B><U><FONT
COLOR="0000ff">IBMMAPS</FONT></U></B><B><FONT COLOR="0000ff">
</FONT></B></A> is an extensive listing of maps to IBM offices, facilities, and plants around
the world. It also includes text directions (in ENglish) from nearby airports.<BR>
<BR>
</TD></TR>

<TR></TR>

<TR VALIGN=top><TD WIDTH="100%"><B><FONT SIZE=4>Breaking the Language Barrier
</FONT></B></TD></TR>

<TR></TR>

<TR VALIGN=top><TD WIDTH="100%"><A HREF="http://www.travlang.com/languages/"
        TARGET="_top"><B><U><FONT COLOR="0000ff">Foreign Language for
                Travelers</FONT></U></B></A><BR>
This site translates common words and expressions used in everyday life, not only a
business setting, in languages ranging from Africaans to Zulu. It also offers a Translating
Dictionary, Currency Exchange, a Word of the Day, and a Message Board where you can
chat with others about your travel experiences (provided you have a Java capable browser).
</TD></TR>

<TR VALIGN=top><TD WIDTH="100%"><A HREF="http://www.june29.com/HLP/"
TARGET="_top"><B><U><FONT COLOR="0000ff">The Human Languages
Page</FONT></U></B></A><BR>
The Human-Languages Page is a comprehensive catalog of language resources on the
Internet. Over 1600 links in its database contain the best language links the Web has to offer.
Whether you're looking for on-line language lessons, translating dictionaries, native literature,
translation services, software, language schools, or just a little information on a language
you've heard about, this site probably has something to suit your needs. </TD></TR>

<TR></TR>

<TR VALIGN=top><TD WIDTH="100%"><B><FONT SIZE=4>Customs
Regulations</FONT></B></TD></TR>

```
<TR VALIGN=top><TD WIDTH="100%"><A HREF="http://www.excess-
baggage.com/customs" TARGET="_top"><B><U><FONT COLOR="0000ff">Excess
Baggage: Customs Guide</FONT></U></B></A>Find customs information and customs
regulations for over 100 countries and territories in the Customs Guide. See what documents
you need to provide, how much time customs procedures will take, quarantine regulations,
duty rates, and tax. The only Customs site on the Internet dealing with customs regulations
for household effects and unaccompanied baggage. The site offers customs assistance,
customs advice and other customs information where available.</TD><TD></TD></TR>
</TABLE>
<CENTER><A HREF="#top"><IMG SRC="/Global/GGArt.nsf/Links/top/$FILE/top.gif"
WIDTH=130 BORDER=0 ALT="Back to Top"></A></CENTER><BR>
<TABLE WIDTH=600 HEIGHT=19 BORDER=0 CELLPADDING=0 CELLSPACING=0
VALIGN=BOTTOM><TR HEIGHT=19><TD VALIGN=BOTTOM ALIGN=LEFT><A
HREF="http://w3.ibm.com" TARGET="_top"><IMG
    SRC="/Global/GGArt.nsf/Links/ibmnavp1/$FILE/ibmnavp1.gif" WIDTH=120 HEIGHT=19
        ALT="w3.ibm.com" BORDER=0 VALIGN=BOTTOM ALIGN=LEFT VSPACE=0
    HSPACE=0></A><A HREF="http://w3.ibm.com/ibm" TARGET="_top"><IMG
    SRC="/Global/GGArt.nsf/Links/ibmnavp2/$FILE/ibmnavp2.gif" WIDTH=102 HEIGHT=19
        ALT="About IBM" BORDER=0 VALIGN=BOTTOM ALIGN=LEFT VSPACE=0
    HSPACE=0></A><A HREF="http://w3.ibm.com/search" TARGET="_top"><IMG
    SRC="/Global/GGArt.nsf/Links/ibmnavp3/$FILE/ibmnavp3.gif" WIDTH=75 HEIGHT=19
        ALT="Search" BORDER=0 VALIGN=BOTTOM ALIGN=LEFT VSPACE=0
    HSPACE=0></A><A HREF="http://w3.ibm.com/help" TARGET="_top"><IMG
    SRC="/Global/GGArt.nsf/Links/ibmnavp4/$FILE/ibmnavp4.gif" WIDTH=79 HEIGHT=19
        ALT="Help" BORDER=0 VALIGN=BOTTOM ALIGN=LEFT VSPACE=0
                HSPACE=0></A><A
    HREF="/Global/Feedback.nsf/Feedback?OpenForm&Style=Frames"
            TARGET="Bottom"><IMG SRC="/Global/GGArt.nsf/
Links/ibmnavp5/$FILE/ibmnavp5.gif" WIDTH=94 HEIGHT=19 ALT="Feedback"
BORDER=0 VALIGN=BOTTOM ALIGN=LEFT VSPACE=0 HSPACE=0></A><A
HREF="http://www.ibm.com" TARGET="_top"><IMG
    SRC="/Global/GGArt.nsf/Links/ibmnavp6/$FILE/ibmnavp6.gif" WIDTH=130 HEIGHT=19
    ALT="www.ibm.com" BORDER=0 VALIGN=BOTTOM ALIGN=LEFT VSPACE=0
    HSPACE=0></A></TD></TR></TABLE></BODY>
</HTML>
```

Figure 9E

Note: This is only a portion of the entire index of links for this web page. The remainder was truncated so that the screen capture would fit easily on a page.

| | |
|---|---|
| 17. | Getting through customs |
| 18. | IBMMAPS |
| 19. | Foreign Languages Page |
| 20. | The Human Languages Page |
| 21. | Excess Baggage: Customs Guide |
| 22. | Back to top |
| 23. | w3.ibm.com |
| 24. | About IBM |
| 25. | Search |
| 26. | Help |
| 27. | Feedback |
| 28. | www.ibm.com |

This is only a portion of the entire index of links for this web page. The remainder was truncated so that the screen capture would fit easily on a page.

Fig. 11

… # METHOD AND SYSTEM FOR PROVIDING AN INDEX TO LINKED SITES ON A WEB PAGE FOR INDIVIDUALS WITH VISUAL DISABILITIES

FIELD OF THE INVENTION

The present invention relates generally to assistive technology for using information on a display and particularly to using information displayed on a web page for individuals that have visual disabilities.

BACKGROUND OF THE INVENTION

It is a simple matter for most people to scan a web page that is displayed in a typical browser application such as Microsoft Internet Explorer and quickly identify links (by default, any underlined text) to other pages that might be of interest to them. This rapid identification of linked sites is exceptionally useful whenever you are viewing a page that consists primarily of plain text, yet has many interspersed links to other web sites that contain material related to the content of the page currently being viewed. Pages with this type of structure abound on the Internet. Examples include the results pages displayed by search engines and "summary" sites (for example, those that summarize press coverage on key happenings for the day and provide links to the original news articles at the end of each summary for future reference).

Rapid identification of links is also very useful when looking at pages that consist primarily of images where the links are embedded buttons or graphics on the page. The ability to scan web pages and rapidly identify links to associated material allows the typical reader to quickly jump to other relevant sites and thereby allows them to efficiently sift through the large volume of data available on the Internet until they find a page that contains exactly what they were looking for.

People who are blind or who have severe visual impairments cannot perform a rapid visual scan-based identification of links on a given page. Instead, they must typically listen to the content of the entire page as its voiced to them by a screen reader application, remember the links as they are voiced, and then select the one they are interested in after the entire page has been voiced. This is time-consuming and places high demand on that person's short term memory to remember all of the links while simultaneously attempting to pay attention to the rest of the page as it is being voiced. Furthermore, many web pages are not optimally coded for use with a screen reader application. This results in "raw" HTML or other meaningless information being voiced to the user when links on those pages are interpreted by a screen reader.

Accordingly, what is needed is a system and method for allowing a person who is visually impaired to more readily hear or read link information presented on a web page. The present invention addresses such a need.

SUMMARY OF THE INVENTION

A method and system for providing an index to linked sites to a web page is disclosed. The method and system comprises parsing the HTML code of the web page to identify all anchor tag pairs and image map tag pairs in the page. The method further includes storing all HREF attribute values defined within each of the anchor tag pairs and image map tag pairs to an index file and determining the source of each respective HREF attribute.

If the source of any given HREF attribute value is an anchor tag pair, the method and system comprises determining if there is a plain English link text string associated with that HREF attribute value and storing the link text string in the index file with its associated HREF attribute. If no plain English link text string is found associated with a given HREF attribute, the method and system further comprises linking to the page defined by the URL specified in the HREF attribute value and parsing the code of that page for the value of its <TITLE> tag (which by HTML convention, is a very short plain-English description of the contents of the page) and then storing that title value in the index file with its corresponding HREF attribute. The method and system further includes using the original HREF attribute value as a placeholder in the index file if no plain English link text string or title value can be discovered.

If the source of any given HREF attribute value is an image map tag pair, the method and system comprises determining if there is an ALT attribute associated with that HREF attribute value and storing the value of the ALT attribute (which by HTML convention, is "plain-English" text that describes the image) in the index file with its corresponding HREF attribute value. The method and system further includes linking to the page defined by the URL specified in the HREF attribute value and parsing the code of that page for the value of its <TITLE> tag if there is no ALT attribute originally associated with that HREF, in which case the value of the title tag is stored in the index file with its corresponding HREF attribute value. The method and system further includes using the original HREF attribute value as a placeholder in the index file if no ALT attribute value or title value can be discovered.

The method and system further includes creating a second web page based upon the contents of the index file. This second web page, which is an index of the links contained on the original page, is structured such that the plain-English descriptive text for each of the links on the original page can be presented to the user in two ways: an aural (voiced) presentation method in which the index page is served to a screen reader application for voicing, or a visual presentation method in which the plain-English descriptions are superimposed in large, high-contrast text above the hotspot zones of each corresponding HREF attribute value. See U.S. Pat. No. 6,075,537, entitled "Ease of Use Interface to Hotspots in Hypertext Document Pages in Network Display Stations," and assigned to the assignee of the present application, which provides a detailed description of a method for identifying hotspot zones on a page.

A system and method in accordance with the present invention allows blind and vision impaired users to quickly identify links to relevant material when "viewing" web pages that consist primarily of either plain text or images. By generating an aural or visual index to the links on the page being "viewed", blind and visually impaired users can quickly jump to interesting sites that are linked from the current page without having to wait for the entire page to be voiced by the screen reader application.

BRIEF DESCRIPTION OF THE DRAWINGS

FIGS. 5A–5C illustrates underlying HTML code for the web page shown in FIG. 4.

FIG. 7 illustrates an example of the links index page that is created from processing the web page of FIG. 4 in accordance with the present invention.

FIGS. 9A–9E illustrate the underlying HTML code for the web page shown in FIG. 8.

FIG. 11 illustrates an example of the links index page that is created from processing the web page of FIG. 8 in accordance with the present invention.

DETAILED DESCRIPTION

The present invention relates generally to assistive technology for using information on a display and particularly to using information displayed on a web page for individuals that have visual disabilities. The following description is presented to enable one of ordinary skill in the art to make and use the invention and is provided in the context of a patent application and its requirements. Various modifications to the preferred embodiment and the generic principles and features described herein will be readily apparent to those skilled in the art. Thus, the present invention is not intended to be limited to the embodiment shown but is to be accorded the widest scope consistent with the principles and features described herein.

Before going into the details of specific embodiments, it will be helpful to understand from a more general perspective the various elements and methods which may be related to the present invention. Since a major aspect of the present invention is directed to documents such as Web pages transmitted over networks, an understanding of networks and their operating principles would be helpful. We will not go into great detail in describing the networks to which the present invention is applicable. Reference has also been made to the applicability of the present invention to a global network such as the Internet. For details on internet nodes, objects and links, reference is made to the text "Mastering the Internet", G. H. Cady et al., published by Sybex Inc., Alameda, Calif., 1996.

Any data communication system which interconnects or links computer controlled systems at various sites defines a communications network. A network may be as simple as two linked computers or it may be any combination of LANs (Local Area Networks) or WANs (Wide Area Networks). Of course, the internet or World Wide Web is a global network of a heterogeneous mix of computer technologies and operating systems. Higher level objects are linked to the lower level objects in the hierarchy through a variety of network server computers. These network servers are the key to network distribution, such as the distribution of Web pages and related documentation. The HTML language is described in detail in the "Just Java" text and particularly at Chapter 7, pp. 249–268, dealing with the handling of Web pages with embedded hotspot activated linkages and also in the text "Mastering the Internet", Cady and McGregor, published by Sybex, San Francisco, 1996 and particularly pp. 637–642 on HTML in the formation of Web pages.

Figure 1:
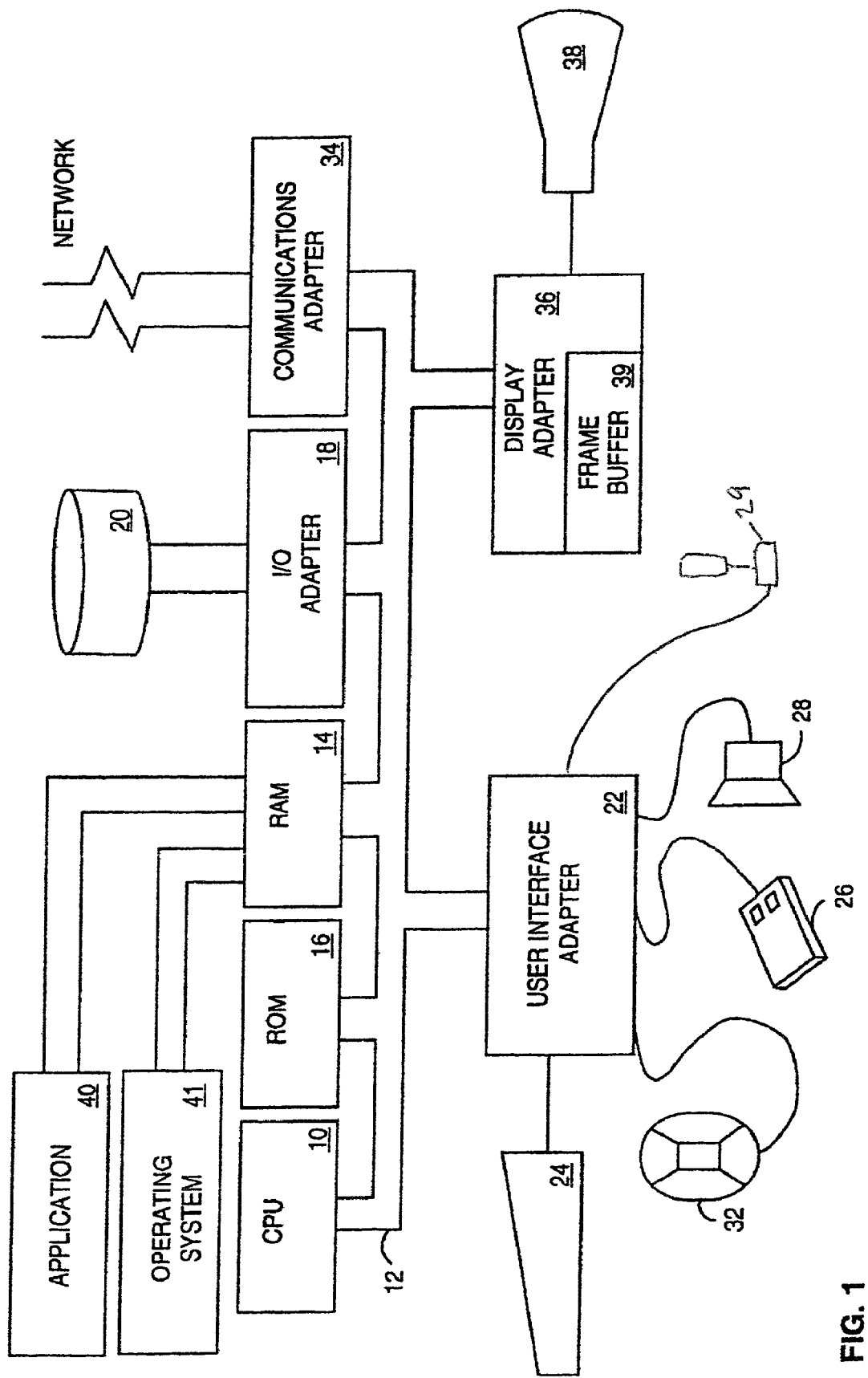
FIG. 1 is a block diagram of a data processing system including a central processing unit and network connections via a communications adapter which is capable of implementing a user interactive workstation on which the received data may be converted into a Web page in accordance with the present invention.

Referring to FIG. 1, a typical data processing system is shown which may be used in implementing the present invention on the receiving interactive workstation. A central processing unit (CPU), such as one of the PowerPC microprocessors available from International Business Machines Corporation (PowerPC is a trademark of International Business Machines Corporation) is provided and interconnected to various other components by system bus 12. An operating system 41 runs on CPU 10 and provides control and is used to coordinate the function of the various components of FIG. 1. Operating system 41 may be one of the commercially available operating systems such as Windows 95 (TM of Microsoft Corporation) or the OS/2 operating system available from International Business Machines Corporation (OS/2 is a trademark of International Business Machines Corporation). Any conventional network browser system involving HTML language with embedded links forms part of application 40, runs in conjunction with operating system 41 and provides output calls to the operating system 41 which implements the various functions to be performed by application 40. Also included in the application software 40 will be the applications of this invention providing an index to linked sites on a Web page that will subsequently be described in detail. The browser program, in combination with the operating system, provides the basic receiving workstation on which the Web pages are received after which the program of the present invention may be dynamically implemented.

A read only memory (ROM) 16 is connected to CPU 10, via bus 12 and includes the basic input/output system (BIOS) that controls the basic computer functions. Random access memory (RAM) 14, I/O adapter 18 and communications adapter 34 are also interconnected to system bus 12. It should be noted that software components including the operating system 41 and the browser, HTML, link indexing algorithm, and dynamic hotspot zone expansion applications 40 are loaded into RAM 14 which is the computer system's main memory. I/O adapter 18 may be a small computer system interface (SCSI) adapter that communicates with the disk storage device 20, i.e., a hard drive. Communications adapter 34 interconnects bus 12 with an outside network enabling the workstation to communicate with Web servers to receive document pages over a local area network (LAN) or wide area network (WAN) which includes, of course, the internet or World Wide Web. I/O devices are also connected to system bus 12 via user interface adapter 22 and display adapter 36. Keyboard 24, trackball 32, mouse 26, speaker 28 and microphone 29 are examples of I/O devices interconnected to bus 12 through user interface adapter 22. Display adapter 36 includes a frame buffer 39 which is a storage device that holds a representation of each pixel on the display screen 38. Images may be stored in frame buffer 39 for display on monitor 38 through various components such as a digital to analog converter (not shown) and the like. By using the aforementioned I/O devices, a user is capable of inputting data and control selections to the system through the keyboard 24, trackball 32, mouse 26 or microphone 29 and of receiving output information from the system via display 38 or speaker 28.

Figure 2:
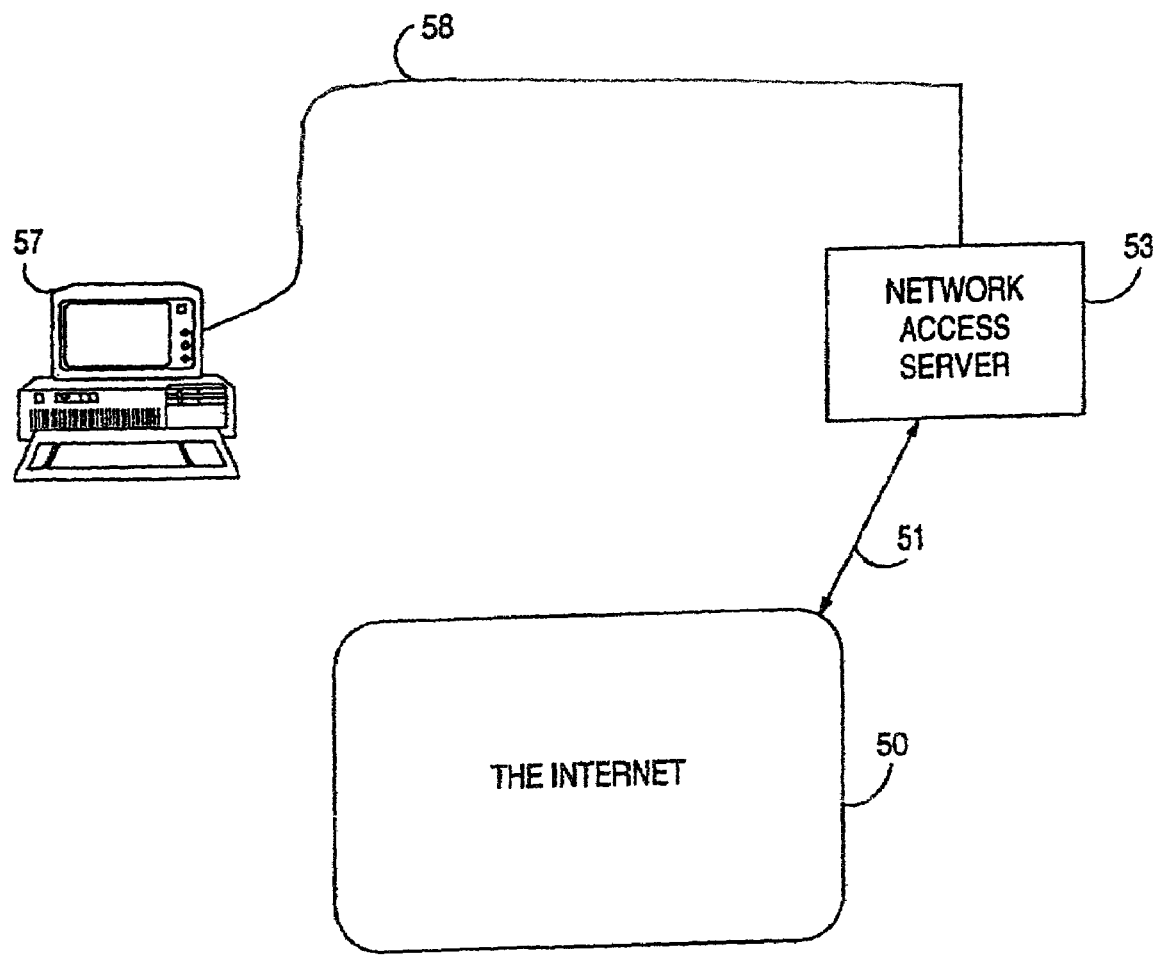
FIG. 2 is a generalized diagrammatic view of an internet portion upon which the present invention may be implemented.

A generalized diagram of a portion of an internet, which the computer controlled display terminal 57 used for Web page or other document display of the present invention, is connected as shown in FIG. 2. Computer controlled display terminal 57 is the computer system shown in FIG. 1 and connection 58 (FIG. 2) is the network connection shown in FIG. 1.

Reference may be made to "Mastering the Internet," Cady, et al., particularly at pp. 137–147 for typical connections between local display workstations to the internet via network servers any of which may be used to implement the system on which this invention is used. The system embodiment of FIG. 2 is typically known as a high-speed connection. Such high-speed connections are utilized extensively through network access servers 53 which are linked 51 to the net 50. The servers 53 are maintained by a service provider to the client's display terminal 57. The host's server 53 is accessed by the client terminal 57 through a high-speed linkage 58 such as DSL or a T1 line. The HTML files representative of the Web pages are downloaded to display terminal 57 via the line linkages from server 53 which may have accessed them from the internet 50 via linkage 51.

A system and method in accordance with the present invention is utilized in the environment described in FIGS. 1 and 2 to help visually impaired users to more readily use information on the web. The system and method in accordance with the present invention provides a substantial advantage over other link index methods (such as the one provided in Microsoft Internet Explorer) in that it intelligently generates a meaningful and easily understandable "plain-English" index of the links on any given page. This index can be aurally presented (voiced) and/or, when combined with a hotspot zone identification method (see U.S. Pat. No. 6,075,537, entitled "Ease of Use Interface to Hotspots in Hypertext Document Pages in Network Display Stations," and assigned to the assignee of the present application) can also be visually presented.

To more particularly describe the features of the present invention in more detail refer now to the following discussion in conjunction with the accompanying figures.

A system and method in accordance with the present invention dynamically generates a "plain English" index of the links on any given web page. This index page is then served to the screen reader application on the user's workstation for voicing. The system and method in accordance with the present invention operates in accordance with the following steps.

Figure 3:
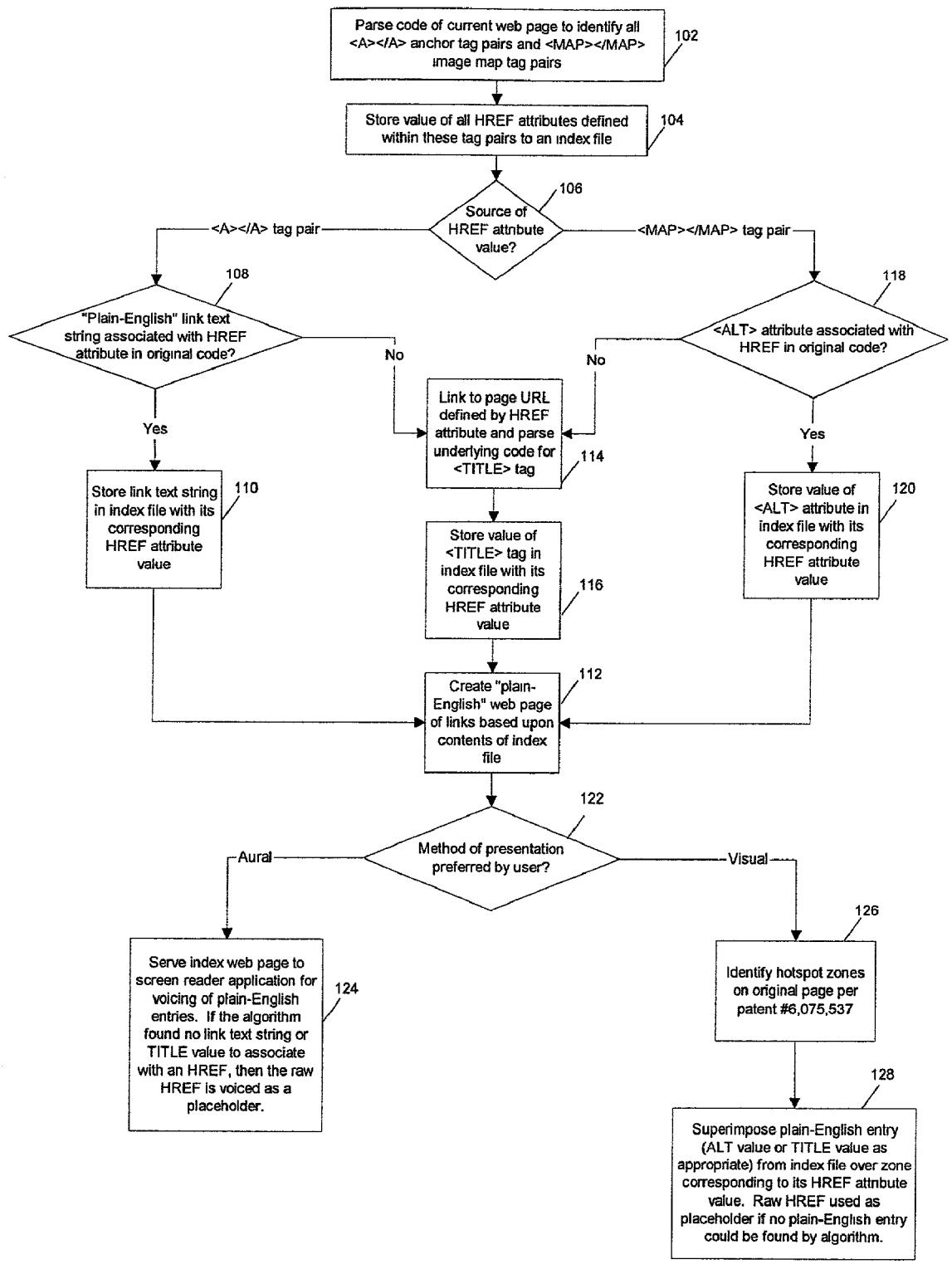
FIG. 3 is a flow chart which illustrates processing of a web page in accordance with the present invention.

FIG. 3 is a flow chart of the system and method which illustrates processing of a web page in accordance with the present invention. First, the underlying HTML code of the page currently being viewed is parsed to identify all anchor tag pairs and image map tag pairs, via step 102. Next, the values for all HREF attributes defined within the tag pairs are stored within an index file via step 104. Next, the source of the HREF attribute value is determined via step 106. If the source is an anchor tag pair, it is determined if there is a "plain English" link text string associated with that HREF attribute, via step 108. If there is a link text string associated with the HREF attribute, then the link text string is stored in the index file with its corresponding HREF attribute value, via step 110. If there is no link text string associated with the HREF attribute value (step 108), then a link is made to the page URL defined by the HREF attribute and the underlying code of that page is parsed for a title tag, via step 114. Thereafter, the value of the title tag with its corresponding HREF value is stored in the index file, via step 116. If the source of the HREF attribute (step 106) is an image map tag pair, it is determined whether an ALT attribute is associated with the HREF attribute in the original code, via step 118. If the answer is yes, then the value of the ALT attribute is stored in the index file with its corresponding HREF attribute value, via step 120,. If, on the other hand, there is no ALT attribute associated with the HREF attribute in the original code, then steps 114 and 116 are executed to capture and store the value of the title tag in the page defined by the HREF attribute. Then, a plain-English web page of links is created from the contents of the index file, via step 112. The HREF attribute value is used as a placeholder if no link text string or title value can be discovered. After the plain-English web page is created, it is presented to the user. Therefore, next the method of presentation preferred by the user is determined, via step 122. If the method is aural, then the web page is served to a screen reader application for voicing, via step 124. If the algorithm found no link text string or title value to associate with an HREF, then the raw HREF is voiced as a placeholder. If, on the other hand, the presentation is visual, then hotspot zones are identified, via step 126. Thereafter, the plain-English entry is superimposed from the index file over a zone corresponding to its HREF attribute value, via step 128. Raw HREF is used as a placeholder if no plain-English entry could be found by algorithm.

Following are two simple examples of the operation of present invention when interpreting an anchor tag pair and an image map tag pair:

Anchor Tag Example

Consider a web page that consists solely of one link as shown here:

IBM Corporation Home Page

The actual line of HTML code that underlies this link is as follows:

<A HREF="http://www.ibm.com">IBM Corporation Home Page</A>

The algorithm described in the present invention would parse the code and for each <A></A> anchor tag pair found, it would store two items in the links index file that it generates. One of the items stored is the value of the HREF attribute contained within the <A></A> anchor tag pair, which in this example is "http://www.ibm.com". This is the page that the web browser would link to if you clicked on this link. The other item stored in the index file is the descriptive "plain-English" link text string (if any such text has been defined) that is associated with this HREF attribute. In this example, the "plain-English" text string is "IBM Corporation Home Page". When the index page is served to a screen reader application for browsing, it is the link text string that is voiced instead of the mostly meaningless value of the HREF attribute. The link text string is also what is superimposed above the hotspot zone if a visual index presentation style is preferred by the user. If a link text string is not defined for an HREF attribute within any given <A></A> anchor tag pair, the algorithm will link to the page defined by the HREF, parse that page for the value of the <TITLE> tag, and store that value (which by HTML convention, is a very short plain-English description of the contents of the page), with its corresponding HREF for voicing or visual output. If no TITLE value is present, the algorithm will use the raw HREF value in the index file for voicing or visual output.

Image Map Example

Consider a web page that consists solely of an image link as shown here:

The underlying HTML code used to generate it is as follows:

```
<IMG USEMAP="#LogoMap" SRC=c:\temp\ibmlogo.gif"BORDER="0">
    <MAP NAME="LogoMap">
    <AREA SHAPE="rect" COORDS="0, 0 99, 38" HREF="http://www.ibm.com"
    ALT="IBM Corporation Home Page">
    </MAP>
```

The algorithm described in the present invention would parse the code underlying this page. For each <MAP></MAP> image map tag pair found, it would store two items in the links index file that it generates. One of the items stored is the value of the HREF attribute contained within the <MAP></MAP> image map tag pair, which in this example is "http://www.ibm.com". This is the page that the web browser would link to if you clicked on this image. The other item stored in the index file is the descriptive "plain-English" text that is associated through the <ALT> attribute with this HREF. In this example, the "plain-English" text string defined by the <ALT> attribute is "IBM Corporation Home Page". When the index page is served to a screen reader application for browsing, it is the <ALT> attribute value that is voiced instead of the mostly meaningless value of the HREF attribute. The <ALT> attribute text string is also what is superimposed above the hotspot zone if a visual index presentation style is preferred by the user. If no <ALT> attribute is associated with an HREF within any given <MAP></MAP> image map tag pair, the algorithm will link to the page defined by the HREF and parse that page for the value of the <TITLE> tag and store it with the corresponding HREF for voicing or visual output. If no TITLE value is present, the algorithm will use the raw HREF value in the index file for voicing or visual output.

In a first preferred embodiment, the index web page generated by the algorithm described in the present invention would be served to the active screen reader application so that the index can be voiced to the user. Once the index page has been created and is ready for voicing by the screen reader application, a beep or the phrase "Index ready" could be voiced so that the user knows when the index is available. This index page could be prefaced with the following: "This page contains links to the following web sites. Select the number of the page you want to go to." If the user has some form of speech recognition/control system available on their workstation, they could speak the number of the page. Other input methods such as mouse or keyboard selection would also be supportable via this system. This method provides an aural index to linked sites.

In a second preferred embodiment, the index page can be used to define plain-English labels for each link that is present on the page. See U.S. Pat. No. 6,075,537, entitled "Ease of Use Interface to Hotspots in Hypertext Document Pages in Network Display Stations," and assigned to the assignee of the present application, which provides a detailed description of a method for identifying hotspot zones on a page. In this embodiment, the plain-English label is superimposed over each zone that corresponds to the link contained within it in large, high-contrast text. A vision-impaired user is allowed to more easily read the link information on the current page.

To describe the invention in the context of detailed examples, refer now to the following.

Below is a URL to a web page on the Internet. http://w3.goingglobal.ibm.com/Global/Global.nsf/AllDocs/Homepage?OpenDocume nt&Style=Frames&Area=World. (note that this site is only accessible from within the IBM firewall).

Figure 4:
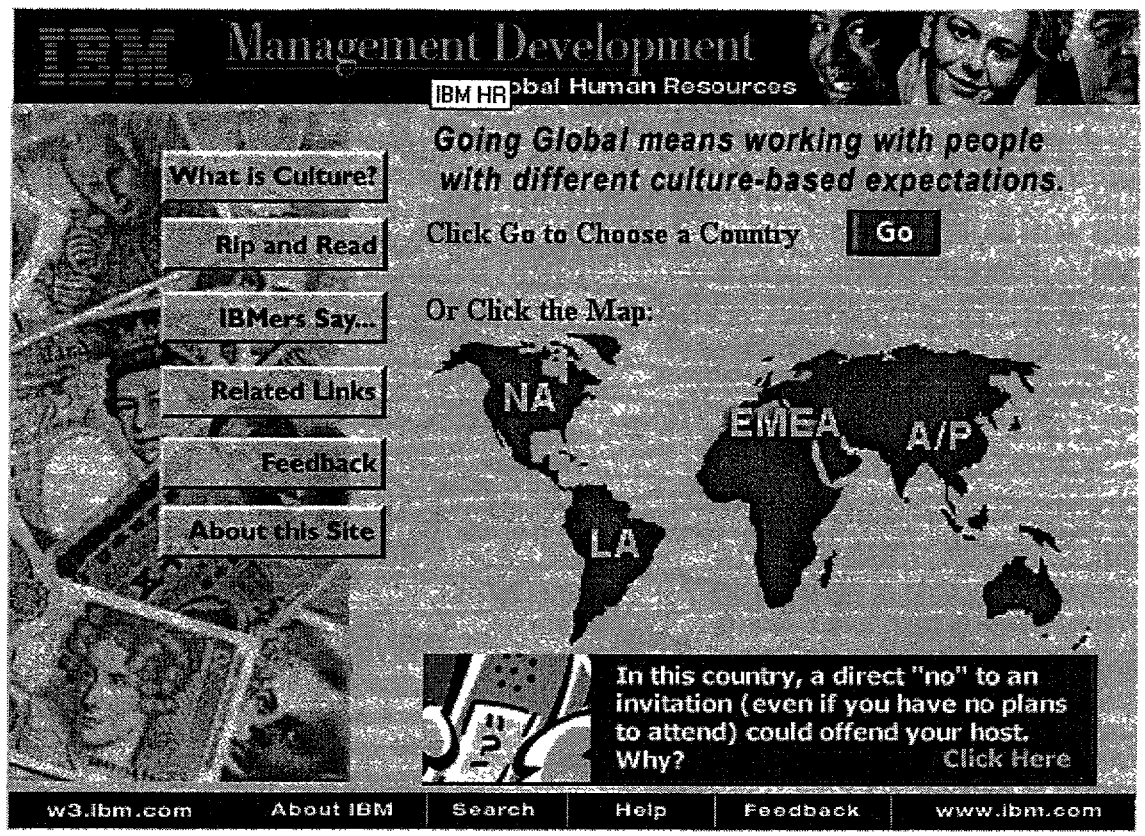
FIG. 4 illustrates a web page on the Internet that consists primarily of images.

This URL points to a web page entitled "Going Global" shown in FIG. 4. The underlying HTML code for this page is shown in FIGS. 5A–5C.

Figure 6:
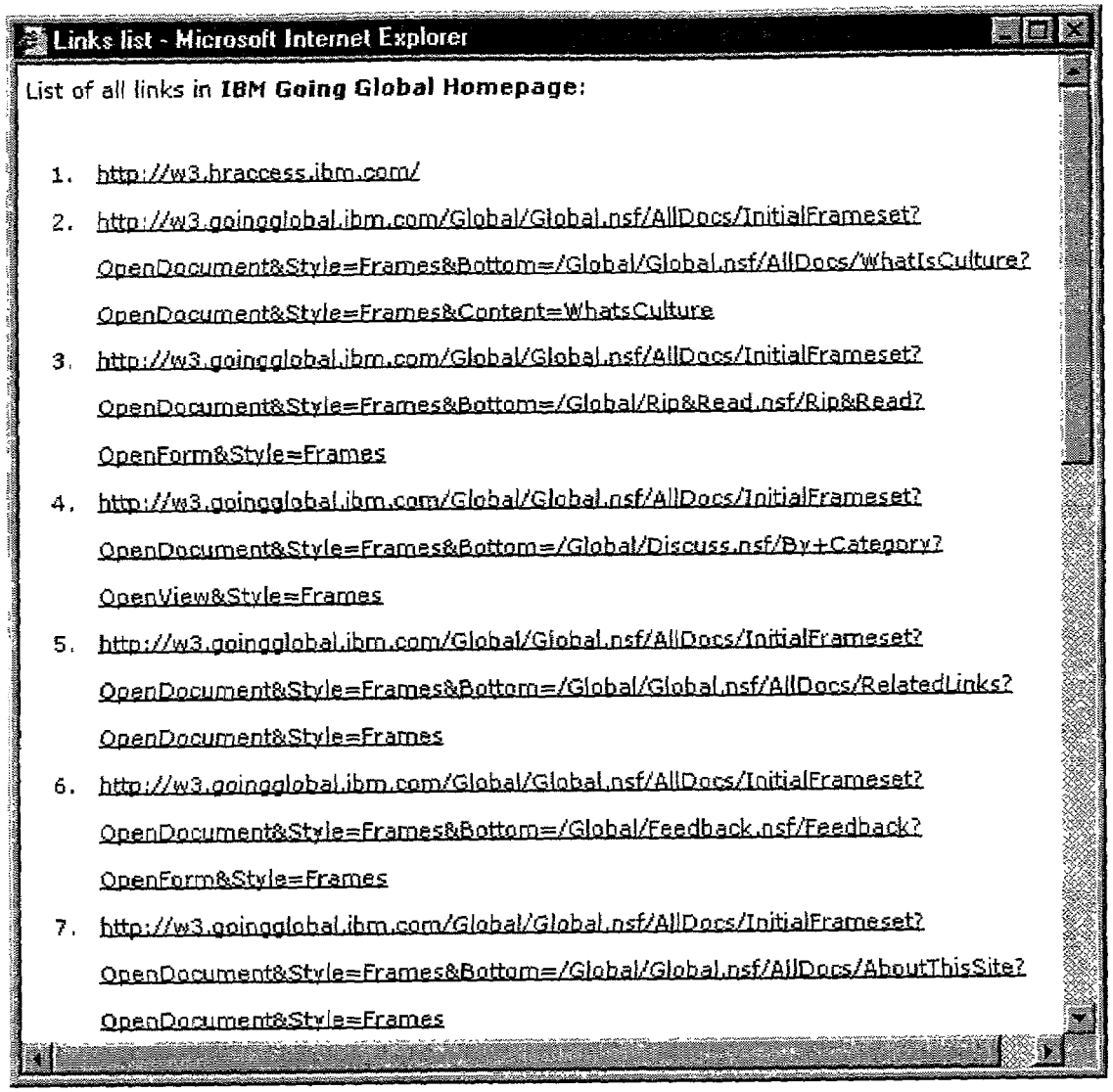
FIG. 6 illustrates the "Links List" display generated by a standard web browser from the web page in FIG. 4.

The "Links List" generated by Microsoft Internet Explorer (accessed by right-clicking on the page and choosing Links List from the pop-up menu) from this page is shown in FIG. 6.

The list shown in FIG. 6 is generated directly from the HREF attributes in the HTML code-highlighted in bold text in FIGS. 5A through 5C—that defines the Going Global home page. Obviously, this list is not meaningful to the typical user. It is not in plain-English. The URLs in their raw form tell the user very little, if anything, about the actual contents of the page that they link to. In addition, imagine how tedious and frustrating it would be to listen to this entire links page being read aloud to you.

In contrast, a system and method in accordance with the present invention provides an advantage by going one step further. It intelligently links to each of these URLs in the background when appropriate (that is, when a plain-English link text string label or ALT attribute is not originally defined for an HREF in the page being viewed), captures the plain-English titles of the linked target pages, and then displays that title (or the originally defined descriptive string) in the index page it generates instead of the raw (meaningless) URL. The output for the same portion of the Internet Explorer links index for the same Going Global page, but instead using system and method in accordance with the present invention would look something like what is shown in FIG. 7.

This plain-English index shown in FIG. 7 as generated by a system and method in accordance with the present invention is very easy to understand when voiced by a screen reader application when compared to the voiced output of a standard link index (as shown in FIG. 6).

Figure 8:
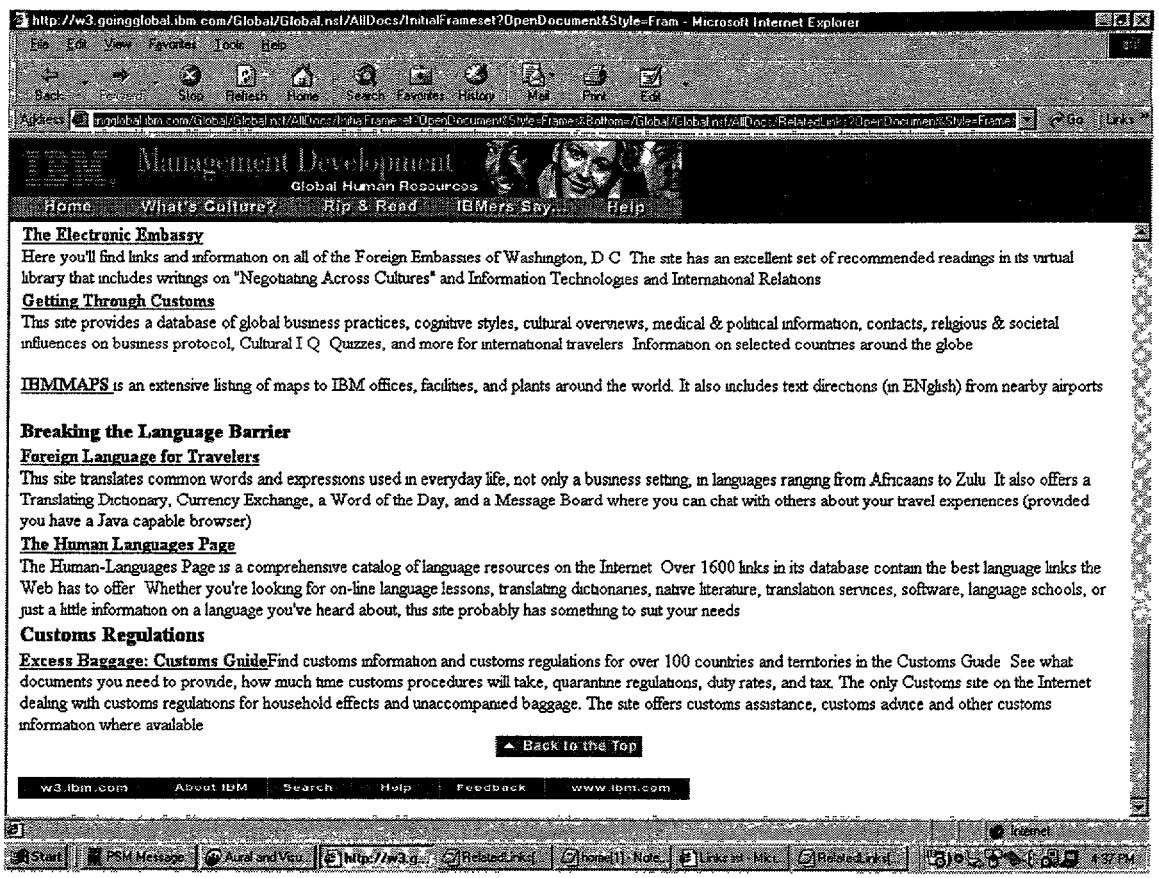
FIG. 8 illustrates a web page on the Internet which consists primarily of text.

Another example from a page that consists primarily of text is shown in FIG. 8. It is taken from the Related Links section of the IBM Going Global site at:

http://w.3goingglobal.ibm.com/Global/Global.nsf/All-Docs/InitialFrameset?OpenDoc ument&FrameStyle=

Frames&Bottom=/Global/Global.nsf/AllDocs/RelatedLinks?OpenDocument&Style=Frames.

A normally sighted person is quickly and easily able to scan through this page and identify the links to other information. In contrast, a blind user dependent upon a screen reader application would be forced to wait for the entire page to be voiced (mentally making note of each link as it is read) or would have to use the standard Links Index generated by a browser. As shown in FIG. 6, the links index of a typical browser application has significant usability problems which are severe enough to make the index virtually useless.

The underlying code for the web page shown in FIG. 8 is illustrated in FIGS. 9A–9E.

Figure 10:
FIG. 10 illustrates a standard browser-generated index of links from the web page shown in FIG. 8.

A portion of the standard browser generated index of links on this page is shown in FIG. 10. Again, note the many raw URLs that are difficult to understand. Conventional browsers are typically smart enough to at least use any defined plain-English text labels within the HREFs, but they do not intelligently link to other pages as necessary to capture title values nor do they use ALT values when present (note that although they are present in the HTML code for this page, they are ignored, thereby making the content of those images difficult to use for blind and visually impaired users). The relevant sections of the HTML code that acted as source material for this index page are highlighted in bold text within the code sample shown in FIGS. 9A–9E.

In contrast, a method and system in accordance with the present invention generates significantly more usable output using the same HTML page as input. A portion of the links index page that is output after utilizing the system and method in accordance with the present invention is shown in FIG. 11.

The information in FIG. 11 as generated by a system and method in accordance with the present invention is much easier to understand when voiced than the standard index generated by a browser as shown in FIG. 10.

Figure 12:
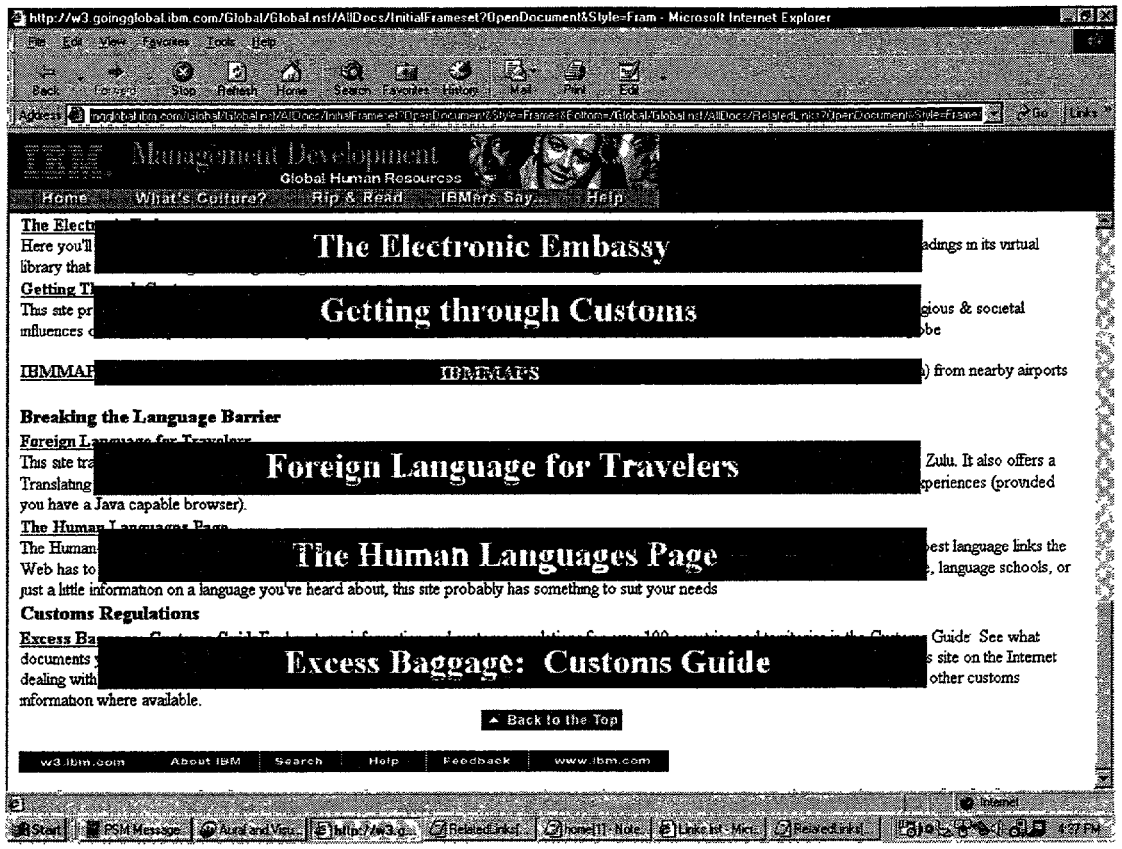
FIG. 12 shows an example of the visual method of presenting the contents of the links index page created from processing the web page of FIG. 8 in accordance with the present invention by superimposing them within the hotspot zones corresponding to each of the links on the original page (such hotspot zones being identified in accordance with U.S. Pat. No. 6,075,537, entitled "Ease of Use Interface to Hotspots in Hypertext Document Pages in Network Display Stations," and assigned to the assignee of the present application).

In the case of the visual presentation method, each zone corresponding to these links would be superimposed with its corresponding text in large, high-contrast text (typically, light text on a dark background provides optimal contrast for visually impaired users). FIG. 12 is an example of what this page might look like when a visually enhanced index based on this algorithm is superimposed above the hotspot zones identified by the method described in U.S. Pat. No. 6,075,537. It is now easy to see meaningful link information with the new presentation compared to trying to read the smaller original text.

CONCLUSION

Accordingly, a system and method in accordance with the present invention allows blind and visually impaired users to quickly identify links to relevant material when "viewing" web pages that consist primarily of either plain text or images. By generating an aural or visual index to the links on the page being "viewed", blind and visually impaired users can quickly jump to interesting sites that are linked from the current page without having to wait for the entire page to be voiced by the screen reader application or attempting to interpret non-meaningful raw-HTML links as provided in a standard link index.

Although the present invention has been described in accordance with the embodiments shown, one of ordinary skill in the art will readily recognize that there could be variations to the embodiments and those variations would be within the spirit and scope of the present invention. Accordingly, many modifications may be made by one of ordinary skill in the art without departing from the spirit and scope of the appended claims.

What is claimed is:

1. A method for providing an index to linked sites on a web page comprising the steps of:
    (a) parsing the code of the web page to identify all anchor tag pairs and image map tag pairs in the page;
    (b) storing at least one first attribute value defined within each of the anchor tag pairs and image map tag pairs to an index file;
    (c) determining a source of the at least one first attribute value;
    (d) determining if there is a link text string associated with the first attribute value if the source of the at least one first attribute value is an anchor tag pair;
    (e) storing the link text string in the index file with its associated at least one first attribute value if there is an associated link text string;
    (f) linking to a page URL defined by the at least one first attribute value and parsing the code of that page for a title tag if it was determined in step (d) that there is no associated link text string;
    (g) storing the value of the title tag in the index file with its associated at least one first attribute; and
    (h) creating a second web page based upon the contents of the index file.

2. The method of claim 1 wherein the at least one first attribute value comprises an HREF attribute value.

3. The method of claim 1 wherein the linking step (f) is performed in the background.

4. The method of claim 1 wherein the link text string comprises plain English language or the native language of the country in which the page is intended for use.

5. The method of claim 1 wherein the title tag provides a plain English description, or other plain language description as appropriate, of the title of the page.

6. The method of claim 1 further comprising a step of (i) presenting the second web page.

7. The method of claim 6 wherein the presenting step (i) comprises the step of (i1) serving the page to an active screen reader to allow the index of the page to be voiced.

8. The method of claim 6 wherein the accessing step (i) comprises the step of (i1) identifying hot spot zones on a web page; and (i2) superimposing the link text string entered from the index file over a zone corresponding to the first attribute value.

9. The method of claim 1 wherein step (f) links to a page URL defined by the at least one first attribute value and the parses the code of that page for a title tag, only if it was determined in step (d) that there is no associated link text string.

10. A method for providing an index to linked sites on a web page comprising the steps of:
    (a) parsing the code of the web page to identify all anchor tag pairs and image map tag pairs in the page;
    (b) storing at least one first attribute value defined within each of the anchor tag pairs and image map tag pairs to an index file;
    (c) determining a source of the at least one first attribute value;
    (d) determining if there is a second attribute associated with the at least one first attribute value if the source of the first attribute value is an image map pair;
    (e) storing the second attribute in the index file with its associated at least one first attribute value if there is an associated plain English link text string;
    (f) linking to a page URL defined by the at least one first attribute value and parsing the code of that page for a title tag if it was determined in step (d) that there is no second attribute;
    (g) storing the value of the title tag in the index file with its associated at least one first attribute; and
    (h) creating a second web page based upon the contents of the index file.

11. The method of claim 10 wherein the at least one first attribute value comprises an HREF attribute value.

12. The method of claim 10 wherein the linking step (f) is performed in the background.

13. The method of claim 10 wherein the link text string comprises plain English language or the native language of the country in which the page in intended for use.

14. The method of claim 10 wherein the title tag provides a plain English description, or other language description as appropriate, of the title of the page.

15. The method of claim 10 further comprising a step of (i) presenting the second web page.

16. The method of claim 15 wherein the presenting step (i) comprises the step of (i1) serving the page to an active screen reader to allow the index of the page to be voiced.

17. The method of claim 15 wherein the accessing step (i) comprises the step of (i1) identifying hot spot zones on a web page; and (i2) superimposing the plain English text string entered from the index file over a zone corresponding to the first attribute value.

18. The method of claim 10 wherein the second attribute includes an ALT attribute value.

19. The method of claim 10 wherein step (f) links to a page URL defined by the at least one first attribute value and parses the code of that page for a title tag, only if it was determined in step (d) that there is no second attribute.

20. A method for providing an index to linked sites on a web page comprising the steps of:
   (a) parsing the code of the web page to identify all anchor tag pairs and image map tag pairs in the page;
   (b) storing a first attribute value defined within each of the anchor tag pairs and image map tag pairs to an index file;
   (c) determining a source of the first attribute value if the source is an anchor tag pair;
   (d) if the source of the first attribute value is an anchor tag pair,
      (1) determining if there is a plain English link text string associated with the first attribute value;
      (2) storing the link text string in the index file with its associated first attribute value if there is an associated plain English link text string;
      (3) linking to a page URL defined by the first attribute value and parsing the code of that page for a title tag if it was determined in step (d)(1) that there is no associated plain English link text string;
      (4) storing the value of the title tag in the index file with its associated first attribute; and
      (5) creating a second web page based upon the contents of the index file;
   (e) if the source of the first attribute value is an image map pair,
      (1) determining if there is a second attribute associated with the first attribute value;
      (2) storing the second attribute in the index file with its associated first attribute value if there is a second attribute;
      (3) linking to a page URL defined by the first attribute value and parsing the code of that page for a title tag if it was determined in step (e)(1) that there is no second attribute; and
      (4) performing steps (d)(4) and (d)(5).

21. The method of claim 20 wherein the first attribute value comprises an HREF attribute value.

22. The method of claim 20 wherein the linking steps (d)(3) and (e)(3) are performed in the background.

23. The method of claim 20 wherein the link text string comprises plain English language or the native language of the country in which the page is intended for use.

24. The method of claim 20 wherein the title tag provides a plain English description, or other language description as appropriate, of the title of the page.

25. The method of claim 20 further comprising a step of (f) presenting the second web page.

26. The method of claim 25 wherein the presenting step (f) comprises the step of (f)(1) serving the page to an active screen reader to allow the index of the page to be voiced.

27. The method of claim 25 wherein the presenting step (f) comprises the step of (f)(1) identifying hot spot zones on a web page; and (f)(2) superimposing the plain English text entered from index file over a zone corresponding to the first attribute value.

28. The method of claim 20 wherein step (d)(3) links to a page URL defined by the first attribute value and parses the code of that page for a title tag, only if it was determined in step (d)(1) that there is no associated plain English link text string, and wherein step (e)(3) links to a page URL defined by the first attribute value and parses the code of that page for a title tag, only if it was determined in step (e)(1) that there is no second attribute.

29. A computer readable medium containing program instructions for providing an index to linked sites on a web page, the program instructions for:
   (a) parsing code of the web page to identify all anchor tag pairs and image map tag pairs in the page;
   (b) storing at least one first attribute value defined within each of the anchor tag pairs and image map tag pairs to an index file;
   (c) determining a source of the at least one first attribute value;
   (d) determining if there is a link text string associated with the first attribute value if the source of the at least one first attribute value is an anchor tag pair;
   (e) storing the link text string in the index file with its associated at least one first attribute value if there is an associated link text string;
   (f) linking to a page URL defined by the at least one first attribute value and parsing the code of that page for a title tag if it was determined in step (d) that there is no associated link text string;
   (g) storing the value of the title tag in the index file with its associated at least one first attribute; and
   (h) creating a second web page based upon the contents of the index file.

30. A computer readable medium containing program instructions for providing an index to linked sites on a web page, the program instructions for:
   (a) parsing code of the web page to identify all anchor tag pairs and image map tag pairs in the page;
   (b) storing at least one first attribute value defined within each of the anchor tag pairs and image map tag pairs to an index file;
   (c) determining a source of the at least one first attribute value;
   (d) determining if there is a second attribute associated with the at least one first attribute value if the source of the first attribute value is an image map pair;
   (e) storing the second attribute in the index file with its associated at least one first attribute value if there is an associated plain English link text string;
   (f) linking to a page URL defined by the at least one first attribute value and parsing the code of that page for a title tag if it was determined in step (d) that there is no second attribute;
   (g) storing the value of the title tag in the index file with its associated at least one first attribute; and (h) creating a second web page based upon the contents of the index file.

31. A computer readable medium containing program instructions for providing an index to linked sites on a web page, the program instructions for:
 (a) parsing code of the web page to identify all anchor tag pairs and image map tag pairs in the page;
 (b) storing a first attribute value defined within each of the anchor tag pairs and image map tag pairs to an index file;
 (c) determining a source of the first attribute value if the source is an anchor tag pair;
 (d) if the source of the first attribute value is an anchor tag pair,
  (1) determining if there is a plain English link text string associated with the first attribute value;
  (2) storing the link text string in the index file with its associated first attribute value if there is an associated plain English link text string;
  (3) linking to a page URL defined by the first attribute value and parsing the code of that page for a title tag if it was determined in step (d)(1) that there is no associated plain English link text string;
  (4) storing the value of the title tag in the index file with its associated first attribute; and
  (5) creating a second web page based upon the contents of the index file;
 (e) if the source of the first attribute value is an image map pair,
  (1) determining if there is a second attribute associated with the first attribute value;
  (2) storing the second attribute in the index file with its associated first attribute value if there is a second attribute;
  (3) linking to a page URL defined by the first attribute value and parsing the code of that page for a title tag if it was determined in step (e)(1) there is no second attribute; and
  (4) performing steps ((g) and (h).

* * * * *